(12) United States Patent
Takeuchi et al.

(10) Patent No.: US 7,045,161 B2
(45) Date of Patent: May 16, 2006

(54) METHOD OF PRODUCING PROCESSED FOOD

(75) Inventors: Yasuo Takeuchi, Aichi (JP); Toshiyuki Sugimoto, Okayama (JP); Toshio Miyake, Okayama (JP)

(73) Assignee: Kabushiki Kaisha Hayashibara Seibutsu Kagaku Kenkyujo, Okayama (JP)

( * ) Notice: Subject to any disclaimer, the term of this patent is extended or adjusted under 35 U.S.C. 154(b) by 7 days.

(21) Appl. No.: 10/258,799

(22) PCT Filed: Feb. 20, 2002

(86) PCT No.: PCT/JP02/01491

§ 371 (c)(1),
(2), (4) Date: Oct. 28, 2002

(87) PCT Pub. No.: WO02/065856

PCT Pub. Date: Aug. 29, 2002

(65) Prior Publication Data

US 2003/0194479 A1  Oct. 16, 2003

(30) Foreign Application Priority Data

Feb. 23, 2001 (JP) ............................. 2001-47472
Aug. 1, 2001 (JP) ............................. 2001-232990
Dec. 17, 2001 (JP) ............................. 2001-38376

(51) Int. Cl.
*A23L 1/09* (2006.01)
*A23L 1/212* (2006.01)
*A23L 3/40* (2006.01)

(52) U.S. Cl. ..................... 426/102; 426/103; 426/237; 426/639; 426/640; 426/658

(58) Field of Classification Search ................ 426/102, 426/103, 237, 639, 640, 658
See application file for complete search history.

(56) References Cited

U.S. PATENT DOCUMENTS

| 4,713,252 A | * | 12/1987 | Ismail ........................ 426/290 |
| 6,005,100 A | | 12/1999 | Mandai et al. |
| 6,479,092 B1 | * | 11/2002 | Wettlaufer .................. 426/639 |

FOREIGN PATENT DOCUMENTS

| EP | 0 951 839 A2 | 10/1999 |
| EP | 0 983 727 A | 3/2000 |
| JP | 11269003 A2 | 3/1998 |
| JP | 10215840 | * 8/1998 |
| JP | 2000270765 A2 | 3/1999 |
| JP | 47472/2001 | 2/2001 |
| JP | 232990/2001 | 8/2001 |
| JP | 383746/2001 | 12/2001 |

* cited by examiner

*Primary Examiner*—Helen Pratt
(74) *Attorney, Agent, or Firm*—Browdy and Neimark, PLLC

(57) ABSTRACT

The object of the present invention is to provide a process for producing processed foods, which effectively exert the inherent flavor and taste of food materials, provide superior preservative stability, and keep the original form and color of the food materials; and to provide processed foods produced by the process. The object is solved by establishing the process for producing processed foods which is characterized in that it comprises the steps of contacting raw food materials with a saccharide to accrete and/or penetrate the saccharide to and/or into an intact food material without blanching and then heating the resulting mixture by one or more heating methods selected from the group consisting of steaming, baking, frying, and microwaving to effectively exert the inherent flavor and taste of the food material, and to provide superior preservative stability; and processed foods produced by the process.

4 Claims, No Drawings

METHOD OF PRODUCING PROCESSED FOOD

TECHNICAL FIELD

The present invention relates to a process for producing processed foods, more particularly, to a process for producing processed foods, which is characterized in that it comprises the steps of contacting a raw food material(s) with a saccharide(s) in a solid or liquid form to accrete and/or penetrate the saccharide(s) to and/or into an intact food material without blanching and then heating the resulting mixture by one or more heating methods selected from the group consisting of steaming, baking, frying, and microwaving to effectively exert the inherent flavor and taste of food material, and to provide superior preservative stability; and processed foods produced by the process.

BACKGROUND ART

Processed foods are produced by using various methods, used widely, and essential for recent eating habit. Their taste, form, and properties easily change depending on their processings, and may be often deteriorated depending on their preserving conditions. As a technique to process food materials, raw food materials such as raw vegetables have been processed through a step of blanching by soaking in a large amount of heated aqueous solution. The main object of blanching is to inactivate enzymes contained in food materials by heating to prevent them from their quality change and deterioration by their own enzymatic reactions, to extend the range of seasoning choice, and to remove harshness and macerate tissues for facilitating the production of various processed foods. However, it has been known that the inherent color of food materials is lost by changing the quality in a heated aqueous solution and that the preservative stability of the obtained products is deteriorated. As a method to improve them, those which freeze processed foods and enclose them by using inactivated gases have been proposed. As a method to improve them with saccharides, for example, Japanese Patent Kokai No.270,765/00 discloses a method to soak processed foods in a cyclodextrin solution after blanching where green and yellow vegetables processed by the method less fade during storing. However, these methods have the drawback that is difficult to apply to food materials which are easily changed in quality and deteriorated by blanching.

DISCLOSURE OF INVENTION

The present invention aims to establish a process for producing processed foods in which the drawback of blanching is solved. The present inventors eagerly studied the prior art and the necessity and unnecessity of blanching before they decided the object of the present invention. For example, Japanese Patent Kokai No. 269,003/99 discloses a method to replace all or the most of the inner water of food materials with α,α-trehalose by boiling after soaking raw food materials in a heated α,α-trehalose solution or soaking them in an α,α-trehalose solution after boiling, and then drying the resultant. In the method, as a treatment before heating, it is disclosed that food materials are treated with 60° C. α,α-trehalose solution for two hours to penetrate α,α-trehalose into them as much as possible. In spite of no blanching, the method is difficult to apply to food materials which are easily changed in qualities or deteriorated by soaking in a heated aqueous solution for a relatively-long period of time. Additionally, in the method, the food materials should be prevented from microbial contamination. The method to soak food materials after heating had the drawback that it was difficult to be applied to food materials which were susceptible to change their form and were difficult to absorb moisture because of the heat denaturation on their surfaces.

Japanese Patent Kokai No. 50,817/00 discloses a method to heat and dehydrate intact or cut raw food materials with a heated aqueous α,α-trehalose solution with a relatively-high concentration, and then dry them alone or after processing. By using this method, food materials were dehydrated and concentrated by losing a part or most of their moisture as vapor, followed by obtaining dried products with a large quantity of α,α-trehalose replacing the moisture. However, it was found that there existed the drawback that the inherent color, flavor, and taste of food materials were dissolved in a saccharide solution and lost from the food materials, because the food materials were partially treated with similar steps as blanching and/or boiling steps, even though they contained a saccharide solution with a relatively-high concentration.

SUMMARY OF THE INVENTION

Considering the above drawbacks of prior arts, the first object of the present invention is to establish a process for producing processed foods to effectively exert their inherent flavor and taste, provide superior preservative stability, and satisfactorily keep their original form and color, and the second object is to provide processed foods produced by the process.

The present inventors eagerly studied the use of saccharides to exert the inherent flavor and taste of food materials. As a result, they found as new facts that processed foods, which effectively exert and keep the inherent flavor and taste of food materials, can be produced by adhering and/or penetrating a saccharide(s) to and/or into raw food materials without blanching and then heating the resulting mixture by one or more heating methods selected from steaming, baking, frying, and microwaving; and that processed foods with superior preservative stability for a relatively-long period of time can be obtained by drying or freezing . Thus, the present invention was accomplished by establishing the above novel process for producing processed foods. It was found that the process has remarkably-high industrial significance as the steps to be successively conducted. The present invention was also accomplished by establishing processed foods obtained by the process which exert the inherent flavor and taste of food materials.

BEST MODE OF THE INVENTION

Examples of the food materials used in the present invention are vegetables such as root crops, for example, carrots, lotus roots, onions, burdocks, Japanese radishes, taros, yams, sweet potatoes, and potatoes; leafy vegetables, for example, lettuces, chicories, Chinese cabbages, cabbages, leeks, kales, moreheiya or *Corchorus olitorius, Angelica keiskei,* spinaches, komatsuna (a kind of Chinese cabbage), nozawana (a kind of turnip), *Chrysanthemum coronirium,* chingensai or pak-choi, angelica trees, young leaves of tee, and leaves of labiate; fruiting vegetables, for example, okura or gumbos, cauliflowers, brocolis, eggplants, tomatoes, cucumbers, pumpkins, zucchini, green peppers, paprikas, field peas, kidney beans, and green soybeans; fruits such as lemons, citrons, sudachi (a kind of citrus fruit), shaddocks, kumquats, bananas, pineapples, mangoes, kiwifruits, strawberries, hawthorns, blueberries, grapes, peaches, plums, apples, pears, and persimmons; nuts and seeds such as broad beans, peanuts, walnuts, and chestnuts; animal meats from cattles, horses, sheeps, pigs, chickens, and whales; fishes and shellfishes such as tunas, bonitoes, sierras, cods, flatfishes, breams, congers, sardines, mackerels, horse mackerels, herrings, sauries, salmons, trouts, small fishes, scallops, turban shells, abalones, shrimps, crabs, mantis shrimps, octopuses, and cuttlefishes; seaweeds such as wakame seaweed or undaria pinnatifida and tangs; and mushrooms such as shiitake mushrooms, winter mushrooms or *Celtis sinensis,* and shimeji mushrooms or *Lyophyllum shimeji.* Food materials are not particularly limited to the above materials, and any food materials can be used as long as the process of the present invention can apply to. Any forms of food materials such as an intact, tissue, organ, and cut forms can be used.

The saccharides used in the present invention are not particularly limited, for example, reducing oligosaccharides such as glucose, galactose, lactose, palatinose, maltose, isomaltose, lactosucrose, maltotriose, maltotetraose, and starch hydrolysates; non-reducing oligosaccharides such as sucrose, α,α-trehalose, neotrehalose, and lactoneotrehalose; cyclic oligosaccharides such as cyclodextrin which is formed a cyclic structure with linked with less than 10 glucose molecules via the α-1,4 bond, cyclodextran which is formed a cyclic structure with linked with them via by the α-1,6 bond, and cyclic tetrasaccharaide which is formed a cyclic structure with alternate linked with them via the alternating the α-1,3, and α-1,6 bonds; and sugar alcohols such as erythritol, sorbitol, maltitol, isomaltitol, lactitol, palatinit, and reducing starch hydrolysate; particularly, relatively-low sweet non-reducing saccharide such as non-reducing oligosaccharides, cyclic oligosaccharides, and sugar alcohols are desirable. In using saccharides, it is important to select the saccharide which is suitable for obtained processed foods in considering each characteristic.

The term "a relatively-low sweet non-reducing saccharide" generally means "a saccharide which the sweetening power is lower than that of sugar as a standard of 100". Saccharides with a sweetening power of 5–80 are preferable, and they can comprise one or more saccharides.

Examples of the relatively-low sweet non-reducing saccharides include α,α-trehalose. As α,α-trehalose has a relatively-low sweetening power of about 45 and clear-sweet taste, it can realize relatively-low sweet taste when used as a sweetener. When α,α-trehalose is added to food materials which require little sweetness, it is not so sweet as sugar and can effectively exert and keep the inherent taste of food materials. When α,α-trehalose is heated with food materials rich in amino acids, it does not cause a browning reaction and fade their inherent color, because α,α-trehalose dose not have a reducing activity and is stable to heat and acids.

If necessary, α,α-trehalose can be advantageously used alone or in combination with other saccharides as far as keeping the desired relatively-low sweetness. In contacting saccharides with food materials, some saccharides can be separately used or in a premixed form. In all cases, the amount of combined or adhered saccharide in the food materials should be limited to an extent where the inherent flavor and taste of food materials is not spoiled. The amount of saccharides to accrete and/or penetrate to and/or into food materials is preferably 20–500 w/w % (abbreviated as "%" hereinafter, unless specified otherwise in the present specification), and desirably 30–300%. It can be appropriately selected to accrete and/or permeate one or more seasonings such as salt, flavorenhancing seasonings, sweeteners except for saccharides, sour agents, and spices; food colors; flavors; antioxidants; preservatives; nutrient supplements such as vitamins and minerals; starches; wheat flours; bread crumbs; and polysaccharides.

In the case of adhering saccharides in solid forms to food materials, commercialized saccharides in intact forms can be contacted with them. However, it is advantageous to accrete fine powdery saccharides with granular diameters as small as possible. When the surfaces of food materials are moist or wet, more saccharides can be adhered thereunto. In using dried food materials, saccharides can easily adhere thereunto after spraying, soaking, or coating water or a solution including adhesives, If necessary.

As an adhesive, any solution can be arbitrarily used, for example, aqueous solutions of saccharides such as non-reducing oligosaccharides, cyclic oligosaccharides, and sugar alcohols; aqueous solutions of polysaccharides such as pullulan and xanthan gum; aqueous solutions of proteins such as albumin and gelatin; and edible oils. The amount of an adhesive should be within the range where operating is facilitated and the problems do not occur:

the inherent taste of food materials is deteriorated, products obtained by drying after heating are hard to dry, and hygroscopicity in preservation is increased.

Considering the adhesion and the permeation of a saccharide to food materials in contacting with the saccharide in a liquid form, the concentration of the saccharide is advantageously set to a level as high as possible. However, an appropriate concentration for each saccharide can be set and used depending on the conditions that the concentration of the saccharide cannot be made high due to its solubility, the viscosity of the saccharide is too high to operate easily, and the final processed foods are over sweetened. In using saccharide solutions with a relatively-low concentration, the adhesion and permeation of saccharides are relatively-low, and the taste and physical properties of the obtained processed foods are inferior. Therefore, the concentration of the saccharide is preferably at least 15%, and more desirably, at least 20%. In contacting a saccharide(s) in a liquid form, and particularly in penitrating a saccharide(s) into food materials, it is desirable to operate at a relatively-low temperature for a relatively-short period of time, usually at 40° C. or lower for 20 minutes, and desirably at 30° C. or lower for 15 minutes, in order to suppress a loss of effective ingredients and to exert the inherent flavor and taste of food materials as much as possible. The contacting step can be effected under the normal pressure or a relatively-high or relatively-low pressure, If necessary.

As the heating condition used in the present invention, any methods can be used if food materials can be heated to 80° C. or higher to inactivate their own enzymes and/or make them boiled conditions without soaking in a heated aqueous solution. Concretely, one or more heating methods selected from steaming, baking, frying, and microwaving are preferable. Examples of the steaming method are those which use a steamer to generate steam by heating water on a flame and to heat food materials by steam previously generated by a boiler. Examples of the baking method are those which use an oven to heat the contents from their upper and/or lower sides. The baking condition is preferably at 100° C. or higher, and desirably, 120–150° C. for 2–15 minutes.

The frying can be any method to heat by using an edible oil such as pan-frying and frying.

In the microwaving, any equipments and devices, which can heat materials by generating and irradiating microwaves, can be used.

In processed foods which are heated by the above heating methods and exert the inherent flavor and taste of food materials, their preservative stability is advantageously increased by further drying and freezing the processed foods.

Examples of the drying method are ventilating, ventilating in heating, radiating infrared rays, vacuum, and freezing in vacuo, and they are appropriately selected depending on object. In the steps of producing processed foods such as cutting food materials, contacting with a saccharide(s), heating, drying or freezing, all or a part of the steps can be sequentially operated or all the steps can be operated batchwise. Considering operating efficiency, sequential operating on a belt conveyor is advantageously adopted.

The heating step used in the present invention is usually sufficient to only one heating method. If necessary, two or more heating methods can be adopted. For example, the processed foods, which are obtained by accreting and/or permeating a saccharide(s) to and/or into raw food materials, steaming, and reducing the moisture content by partial drying, can be advantageously heated by microwaves and inflated to give crispy and light-mouth-feeling, and then coated with sugar or chocolate, If necessary. In heating by microwaves, relatively-thick food materials, with usually five millimeters (mm) or more in thickness, and desirably about 7–30 mm, are easily heated.

In the present invention, processed foods, which exert the inherent flavor and taste of food materials and contain starches, protein, and nutrients such as vitamins, can be produced.

The processed foods thus produced have a saccharide(s) inside and/or on the surface of food materials and have a relatively-low water solubility. Processed foods, produced by using a large amount of easily-crystallized saccharides, have crystallized fine crystals of saccharides on their surfaces, and have a good mouth feeling, superior preservative stability for a relatively-long period of time, and a relatively-high commercial value. The products can be eaten as snack foods such as snack confectioneries, relishes, and refreshments. Particularly, processed foods with α,α-trehalose as a saccharide are easily eaten them without water, because they can be eaten with lesser feel of thirst even at a relatively-high concentration of saccharides. Therefore, they are advantageously used as portable foods and emergency foods which are easily eaten in playing outdoor sports such as mountaineering, hiking, and fishing; moving such as going to office; disaster; and in emergency. The processed foods of the present invention can be also utilized as heated and cooked daily dishes, ingredients for retort pouches and instant foods, and materials for second processed foods such as confectioneries and breads.

The following experiments describe the process for treating raw food materials to produce the tasteful processed foods of the present invention.

The measurement of weight and the evaluation of products were done as follows through out the experiments and examples:

(1) Measurement of Weight

The weight of a sample was measured before contacting with a saccharide (A), after contacting with a saccharide (B), and after drying (C).

The increased weight of saccharide (D) and the increased ratio of saccharide to the weight of dried food material (E) were calculated by substituting the weight of each product for the following equation:

$$D(g) = C_x - C0$$

$$E(\%) = D/C0\ 100$$

where C0 means the weight (g) of a sample after drying without contacting with a saccharide; and After 12 panels' test based on five grade evaluations, where the standard was set at three points and one or two points were added or subtracted therefrom depending on each level of the products, and the total points of 12 members for each item were calculated, the average point for each panel was calculated for evaluation.

The D and E respectively mean the increased weight of saccharide which adheres and/or permeates to and/or into food materials by contacting with the saccharide and the increased rate of saccharide to the weight of dried food materials.

(2) Evaluation of Product

Products were evaluated based on their (a) color, (b) form, (c) taste, and (d) mouth feeling.

After 12 panels' test based on five grade evaluations, where the standard was set at three points and one or two points were added or substrated therefrom depending on each level of the products, and the total points of 12 members for each item were calculated, the average point for each panel was calculated for evaluation.

(a) Evaluation of Color

Color of a product without contacting with a saccharide(s) was set at three points as a standard, while adding points to the standard level when the color of each product became clear by contacting with a saccharide, and reducing points when the color of each product was deteriorated, for example, by fading, changing color, or browning.

(b) Evaluation of Form

Form of a product without contacting with a saccharide(s) was set at three points as a standard, while adding points to the standard level when the panelers felt a product delicious visually and felt that the product kept the intact form before contacting with the saccharide, and reducing points when they did not feel the product delicious visually because of its shrinking or changing in shape.

(c) Evaluation of Taste

Taste of a product without contacting with a saccharide(s) was set at three points as a standard, while adding points to the standard level when the inherent taste of food materials was exerted after contacting with a saccharide, the inherent taste appropriately harmonized with sweetness of the saccharide(s), and the panelers felt the harmonized taste delicious, and reducing points when they felt the harmonized taste unpreferable because of its emphasized bitterness.

(d) Evaluation of Mouth Feeling

Mouth feeling of a product without contacting with a saccharide(s) was set at three points as a standard, while adding points to the standard level when the panelers felt the product soft and crispy after contacting with the saccharide(s), and reducing points when they felt that the product was too hard or limp.

Experiment 1

Influence of Heating Method and the Timing of Contacting a Saccharide with Raw Food Materials on Flavor and Taste Commercialized carrots were washed, peeled with a peeler, and sliced into pieces with about one millimeter in thickness by "V-slicer MV-50", a business manual slicer commercialized by Shinkousha Co., Ltd., Saitama, Japan. The sliced carrots were divided into three equal groups with 300 g by weight on a balance, followed by a treatment to examine the influence of heating method and the timing of contacting a saccharide(s) with raw food materials on flavor and taste. As the treatment in this Experiment, the sliced carrots were placed on a stainless steel wire netting and fixed by covering the carrots with another stainless steel wire netting. Crystalline α,α-trehalose dihydrate powder, commercialized by Hayashibara Shoji, Inc., Okayama, Japan and "TREHA (fine powder)" as a trade name, was sprayed all over the carrots, and after two minutes, excessive amounts of powders were removed by vibrating. The resulting carrots were placed on a stainless steel wire netting without layering and steamed in a prewarmed steamer for three minutes while sending steam under a normal pressure. The steamed carrots were dried at 50° C. for 17 hours by using "FC-612", an air blowing homeothermal drying machine, commercialized by Toyo Engineering Works, Ltd., to obtain a product. The product was weighed as soon as the product was taken out from the drying machine.

As a comparative experiment 1, sliced carrots were placed on a stainless steel wire netting without contacting with the saccharide, α,α-trehalose, steamed, dried similarly as the above experiment, followed by weighing of the obtained product.

As a comparative experiment 2, sliced carrots were blanched by boiling for three minutes in a stainless steel vessel. The blanched carrots were placed on a stainless steel wire netting without contacting with α,α-trehalose and dried similarly as the above experiment, followed by weighing of the obtained product.

As a comparative experiment 3, blanched carrots in the comparative experiment 2 were placed on a stainless steel wire netting and sprayed crystalline α,α-trehalose dihydrate powder all over the carrots, and after two minutes, excessive amounts of powders were removed by vibrating to obtain a product. The obtained product was measured for weight, color, form, taste, and mouth feeling. Table 1 shows the results of the above weight measurements, and table 2 shows the results of the panels' evaluations.

TABLE 1

|  | A | B | C | D | E |
|---|---|---|---|---|---|
| Experiment according to the present invention (Steamed carrots after contacting with saccharide) | 300 | 382 | 100 | 70 | 233 |
| Comparative experiment 1 (Without contacting with saccharide) | 300 | 300 | 30 | 0 | 0 |
| Comparative experiment 2 (Without contacting with saccharide after blanching) | 300 | 318 | 29 | 0 | 0 |
| Comparative experiment 3 (Without contacting with saccharide after blanching) | 300 | 440 | 119 | 90 | 310 |

Note
A: Before contacting (g)
B: After contacting (g)
C: After drying (g)
D: Increased weight of saccharide (g)
E: Increased rate of saccharide (%)

TABLE 2

|  | A | B | C | D | E |
|---|---|---|---|---|---|
| Experiment according to the present invention (Steamed carrots after contacting with saccharide) | 5.0 | 5.0 | 5.0 | 4.8 | 19.8 |
| Comparative experiment 1 (Without contacting with saccharide) | 3.0 | 3.0 | 3.0 | 3.0 | 12.0 |
| Comparative experiment 2 (Without contacting with saccharide after blanching) | 2.5 | 2.1 | 2.1 | 2.8 | 9.5 |
| Comparative experiment 3 (Without contacting with saccharide after blanching) | 3.1 | 2.3 | 2.8 | 2.5 | 10.7 |

Note
A: Color
B: Form
C: Taste
D: Mouth feeling
E: Evaluation points (sum)

The results of the panels' evaluations showed that the product, obtained by contacting raw sliced carrots with α,α-trehalose, steaming, and heating, had fine crystals of α,α-trehalose on its surface as a sugarcoating and superior color and form. Comparing with the product without contacting with α,α-trehalose in the comparative experiment 1, the product with α,α-trehalose effectively exerted the inherent flavor and taste of carrots, and had superior crispy mouth-feeling, appropriately-improved sweet taste by α,α-trehalose, and superior taste.

The products with or without contacting with α,α-trehalose after blanching in the comparative experiment 2 or 3 were deteriorated in the inherent flavor and taste of carrots, because the flavor and taste were dissolved in boiling water of blanching. The product, obtained by contacting with α,α-trehalose in the comparative experiment 3, had a rough mouth-feeling, as the adhered α,α-trehalose was not completely dissolved. The products obtained in comparative experiments 2 and 3 were remarkably changed in shape or shrinked. The product obtained in the comparative experiment 3 was partially broken because of the adhesion treatment of α,α-trehalose after blanching.

Experiment 2

Influence of the Types of Saccharides Used in Contact Treatment on Final Products Sliced carrots with about one mm in thickness, which had been prepared in accordance with Experiment 1, were divided into 10 equal groups with 300 g by weight each by using a balance and subjected to the following treatments to examine the influence of the types of saccharides used in contact treatment. Sliced carrots were placed on a stainless steel wire netting and were fixed by covering the carrots with another stainless steel wire netting. Powders of fructose, glucose, sorbitol, maltose, maltitol, isomaltitol, sucrose, α,α-trehalose or α-cyclodextrin (abbreviated as "α-CD" hereinafter) were sprayed all over the carrots, and after two minutes, excessive amounts of powders were removed by vibrating. Similarly as in Experiment 1, the sliced carrots were placed on a stainless steel wire netting without being layered and steamed in a prewarmed steamer for three minutes while sending steam under a normal pressure. All steamed samples were dried into products. As a control, sliced carrots were treated similarly as in the comparative experiment 1 of Experiment 1. The obtained products were measured for their weight, color, form, taste, and mouth feeling. Table 3 shows the results of the above weight measurements, and table 4 shows the results of the panel's evaluations.

TABLE 3

|  | A | B | C | D | E |
|---|---|---|---|---|---|
| Without contacting with saccharide (Control) | 300 | 300 | 30 | 0 | 0 |
| Fructose | 300 | 403 | 124 | 94 | 313 |
| Glucose | 300 | 397 | 110 | 80 | 267 |
| Sorbitol | 300 | 386 | 101 | 71 | 237 |
| Maltose | 300 | 390 | 106 | 76 | 253 |
| Maltitol | 300 | 398 | 113 | 83 | 277 |
| Isomaltitol | 300 | 376 | 108 | 78 | 260 |
| Sucrose | 300 | 388 | 106 | 76 | 253 |
| α,α-Trehalose | 300 | 379 | 100 | 70 | 233 |
| α-CD | 300 | 371 | 87 | 57 | 190 |

Note
A: Before contacting (g)
B: After contacting (g)
C: After drying (g)
D: Increased weight of saccharide (g)
E: Increased rate of saccharide (%)

TABLE 4

|  | Color | Form | Taste | Mouth feeling | Evaluation (sum) |
|---|---|---|---|---|---|
| Control | 3.0 | 3.0 | 3.0 | 3.0 | 12.0 |
| Fructose | 3.1 | 4.3 | 3.8 | 4.2 | 15.4 |
| Glucose | 2.9 | 4.1 | 4.0 | 4.1 | 15.1 |
| Sorbitol | 4.8 | 4.1 | 3.6 | 4.1 | 16.6 |
| Maltose | 3.9 | 4.1 | 3.8 | 4.0 | 15.8 |
| Maltitol | 4.9 | 4.5 | 4.3 | 4.1 | 17.8 |
| Isomaltitol | 4.8 | 4.6 | 4.5 | 4.1 | 18.0 |
| Sucrose | 4.4 | 4.5 | 3.4 | 4.0 | 16.3 |
| α, α-Trehalose | 5.0 | 5.0 | 5.0 | 4.8 | 19.8 |
| α-CD | 4.9 | 4.4 | 4.1 | 4.7 | 18.1 |

Note
Control: Without contacting with saccharide

The results of the panels' evaluations showed that the products contacted with either of the saccharides were superior to those without contacting With saccharide in all evaluation items. The product contacted with α,α-trehalose was most superior in all evaluation items, and fine crystals of α,α-trehalose were observed on the surface of the product. The product contacted with α-CD was a little inferior to those contacted with α,α-trehalose in the form and taste. The products contacted with either of sorbitol, maltitol, or isomaltitol were a little inferior in their taste and mouth feeling because layers such as films were formed on their surfaces to make the products rather hard. The products contacted with fructose or sucrose were too sweet and inhibited the inherent taste of carrots. Moreover, the product contacted with fructose was changed in color. The products contacted with glucose or maltose were a little changed in color and a little inferior in their form and taste.

From the above results, the products contacted with low sweet non-reducing oligosaccharides, cyclic oligosaccharides, and sugar alcohols were highly evaluated as a whole, and particularly, the product contacted with α,α-trehalose was superior.

Experiment 3

Influence of the Forms of Saccharides Used in Contact Treatment on Final Products Sliced carrots with about one millimeter in thickness, which had been prepared in accordance with Experiment 1, were divided into three equal groups with 300 g by weight each by using a balance and subjected to the following treatments to examine the influence of the forms of saccharides used in contact treatment on final products. To contact with α,α-trehalose in the solid form, sliced carrots were placed on a stainless steel wire netting and fixed by covering the carrots with another stainless steel wire netting. Powders of α,α-trehalose were sprayed all over the carrots, and after two minutes, excessive amounts of powders were removed by vibrating. To contact with α,α-trehalose in a liquid form, 1500 ml of an α,α-trehalose aqueous solution with the concentration of 30% was prepared. The sliced carrots were soaked into this solution for five minutes at 30° C. under stirring conditions to penetrate α,α-trehalose. The carrots were transferred on a stainless steel net basket to drain off. Similarly as in Experiment 1, the sliced carrots were placed on a stainless steel wire netting without being layered and steamed in a prewarmed steamer for three minutes while sending steam under a normal pressure. The steamed carrots were dried into products. As a control, sliced carrots were treated similarly as in the comparative experiment 1 of Experiment 1. The obtained products were measured for their weight, color, form, taste, and mouth feeling. Table 5 shows the results of the above weight measurements, and table 6 shows the results of the panel's evaluations.

TABLE 5

|  | A | B | C | D | E |
|---|---|---|---|---|---|
| Without contacting with saccharide (control) | 300 | 300 | 30 | 0 | 0 |
| Form of contacting saccharide (solid) | 300 | 382 | 100 | 70 | 233 |
| Form of contacting saccharide (liquid) | 300 | 351 | 71 | 41 | 137 |

Note
A: Before contacting (g)
B: After contacting (g)
C: After drying (g)
D: Increased weight of saccharide (g)
E: Increased rate of saccharide (%)

TABLE 6

|  | Color | Form | Taste | Mouth feeling | Evaluation (sum) |
|---|---|---|---|---|---|
| Without contacting with saccaride (control) | 3.0 | 3.0 | 3.0 | 3.0 | 12.0 |
| Form of contacting saccharide (solid) | 5.0 | 5.0 | 5.0 | 4.8 | 19.8 |
| Form of contacting saccharide (liquid) | 4.6 | 5.0 | 4.6 | 4.3 | 18.5 |

The results of the panels' evaluations showed that the amount of saccharide to adhere and/or permeate, color, form, taste, and mouth feeling were changed depending on the form of contacting saccharide. Particularly, in contacting with a saccharide in a solid form, it was found that the amount of saccharide to adhere and/or permeate was more than the case of contacting with a saccharide in a liquid form.

Experiment 4

Influence of the Temperatures in Contacting with Saccharides in Liquid Forms on Final Products Sliced carrots with about one millimeter in thickness, which had been prepared in accordance with Experiment 1, were divided into five equal groups with 300 g by weight each by using a balance and subjected to the following treatments to examine the influence of the temperatures in contacting with saccharides in liquid forms on final products. To contact with a saccharide in a liquid form, 6000 ml of an α,α-trehalose aqueous solution with the concentration of 30% was prepared and divided into four equal groups. The sliced carrots were soaked into these solutions for five minutes at different temperatures under stirring conditions to penitrate α,α-trehalose. These sliced carrots were transferred on a stainless steel net basket to drain off. Similarly as in Experiment 1, the sliced carrots were placed on a stainless steel wire netting without being layered and steamed in a prewarmed steamer for three minutes while sending steam under a normal pressure. All steamed carrots were dried into products. As a control, sliced carrots were treated similarly as in the comparative experiment 1 of Experiment 1. The obtained products were measured for their weight, color, form, taste, and mouth feeling. Table 7 shows the results of the above weight measurements, and Table 8 shows the results of the panels' evaluations.

TABLE 7

|  | A | B | C | D | E |
|---|---|---|---|---|---|
| Without contacting with saccharide (Control) | 300 | 300 | 30 | 0 | 0 |
| Soaking temperature (20° C.) | 300 | 359 | 69 | 39 | 130 |
| Soaking temperature (30° C.) | 300 | 351 | 71 | 41 | 137 |
| Soaking temperature (40° C.) | 300 | 352 | 73 | 43 | 143 |
| Soaking temperature (50° C.) | 300 | 356 | 76 | 46 | 153 |

Note
A: Before contacting (g)
B: After contacting (g)
C: After drying (g)
D: Increased weight of saccharide (g)
E: Increased rate of saccharide (%)

TABLE 8

|  | Color | Form | Taste | Mouth feeling | Evaluation (sum) |
|---|---|---|---|---|---|
| Without contacting with saccharide (Control) | 3.0 | 3.0 | 3.0 | 3.0 | 12.0 |
| Soaking temperature (20° C.) | 4.6 | 5.0 | 4.3 | 4.3 | 18.2 |
| Soaking temperature (30° C.) | 4.6 | 5.0 | 4.6 | 4.3 | 18.5 |
| Soaking temperature (40° C.) | 4.6 | 4.9 | 4.5 | 4.3 | 18.3 |
| Soaking temperature (50° C.) | 4.4 | 4.7 | 4.2 | 4.4 | 17.7 |

The results of the panels' evaluations showed that the rise of soaking temperature was accompanied by an increase of the amount of the saccharide to adhere and/or permeate and the satisfactory mouth feeling. However, the carrots, contacted with the saccharide at relatively-high temperature, had unpreferable taste because the inherent flavor and taste of carrots were left out. The contacting temperature was preferable to 40° C. or lower, and particularly, 30° C. or lower.

Experiment 5

Influence of the Time in Contacting with Saccharides in Liquid Forms on Final Products Sliced carrots with about one millimeter in thickness, which had been prepared in accordance with Experiment 1, were divided into five equal groups with 300 g by weight each by using a balance and subjected the following treatments to examine the influence of the time in contacting with saccharides in liquid forms on final products. To contact with a saccharide in a liquid form, 6000 ml of an α,α-trehalose aqueous solution with a concentration of 30% was prepared and divided into four equal groups. The sliced carrots were soaked into these solutions for different time at 30° C. under stirring conditions to penetrate α,α-trehalose. All carrots were transferred on a stainless steel net basket to drain off. Similarly as in Experiment 1, the sliced carrots were placed to a stainless steel wire netting without being layered and steamed in a prewarmed steamer for five minutes while sending steam under a normal pressure. The steamed carrots were dried into products. As a control, sliced carrots were treated similarly as in the comparative experiment 1 of Experiment 1. The obtained products were measured for their weight, color, form, taste, and mouth feeling. Table 9 shows the results of the above weight measurements, and table 10 shows the results of the panels' evaluations.

TABLE 9

|  | A | B | C | D | E |
|---|---|---|---|---|---|
| Without contacting with saccharide | 300 | 300 | 30 | 0 | 0 |
| Soaking time (2 min) | 300 | 328 | 45 | 15 | 50 |
| Soaking time (5 min) | 300 | 342 | 71 | 41 | 137 |
| Soaking time (20 min) | 300 | 351 | 71 | 41 | 137 |
| Soaking time (60 min) | 300 | 371 | 74 | 44 | 147 |

Note
A: Before contacting (g)
B: After contacting (g)
C: After drying (g)
D: Increased weight of saccharide (g)
E: Increased rate of saccharide (%)

TABLE 10

|  | Color | Form | Taste | Mouth feeling | Evaluation (sum) |
|---|---|---|---|---|---|
| Without contacting with saccharide | 3.0 | 3.0 | 3.0 | 3.0 | 12.0 |
| Soaking time (2 min) | 4.6 | 4.3 | 4.1 | 4.2 | 17.2 |
| Soaking time (5 min) | 4.6 | 5.0 | 4.6 | 4.3 | 18.5 |
| Soaking time (20 min) | 4.6 | 4.8 | 4.8 | 4.3 | 18.5 |
| Soaking time (60 min) | 4.4 | 4.7 | 4.0 | 4.4 | 17.5 |

The results of the panels' evaluations showed that the increase of soaking time was accompanied by the increase of the amount of the saccharide to adhere and/or permeate and the satisfactory taste and mouth feeling. Judging from the properties of the obtained products, it was enough to soak for at least five minutes. It was observed that taste and flavor tend to be spoiled during a relatively-long period of soaking time.

Experiment 6

Influence of the Concentrations of Saccharide Aqueous Solutions Used in Contacting with Saccharides in Liquid Forms on Final Products Sliced carrots with about one millimeter in thickness, which had been prepared in accordance with Experiment 1, were divided into five equal groups with 300 g by weight each by using a balance and subjected to the following treatments to examine the influence of the concentrations of saccharide aqueous solutions in contacting with saccharides in liquid forms. To contact with a saccharide in a liquid form, 1500 ml of α,α-trehalose aqueous solutions with different concentrations were prepared. The sliced carrots were soaked into these solutions for five minutes at 30° C. under stirring conditions to penetrate α,α-trehalose. These carrots were transferred on a stainless steel net basket to drain off.

Similarly as in Experiment 1, the carrots were placed on a stainless steel wire netting without being layered and steamed in a prewarmed steamer for three minutes while sending steam under a normal pressure. The steamed carrots were dried into products. As a control, sliced carrots were treated similarly as in the comparative experiment 1 of Experiment 1. The obtained products were measured for their weight, color, form, taste, and mouth feeling. Table 11 shows the results of the above weight measurements, and table 12 shows the results of the panels' evaluations.

TABLE 11

|  | A | B | C | D | E |
|---|---|---|---|---|---|
| Without contacting with saccharide (control) | 300 | 304 | 30 | 0 | 0 |
| Saccharide concentration (5%) | 300 | 318 | 35 | 6 | 20 |
| Saccharide concentration (15%) | 300 | 332 | 54 | 25 | 83 |
| Saccharide concentration (30%) | 300 | 351 | 71 | 41 | 137 |
| Saccharide concentration (45%) | 300 | 362 | 87 | 58 | 193 |

Note
A: Before contacting (g)
B: After contacting (g)
C: After drying (g)
D: Increased weight of saccharide (g)
E: Increased rate of saccharide (%)

TABLE 12

|  | Color | Form | Taste | Mouth feeling | Evaluation (sum) |
|---|---|---|---|---|---|
| Without contacting with saccharide (control) | 3.0 | 3.0 | 3.0 | 3.0 | 12.0 |
| Saccharide concentration (5%) | 3.8 | 3.6 | 4.1 | 3.6 | 15.1 |
| Saccharide concentration (15%) | 4.6 | 4.6 | 4.7 | 4.1 | 18.0 |
| Saccharide concentration (30%) | 4.6 | 5.0 | 4.6 | 4.3 | 18.5 |
| Saccharide concentration (45%) | 4.6 | 5.0 | 4.8 | 4.4 | 18.8 |

The results of the panels' evaluations showed that the increase of the saccharide concentration was accompanied by the increase of amount of the saccharide to adhere and/or permeate and the satisfactory mouth feeling. The concentration of 15% or higher is preferable to produce a good product.

The following concrete examples describe the preferred embodiments of the present invention, and the present invention is not limited thereunto.

EXAMPLE 1

Kintoki carrots (*Daucus carota*) were treated similarly as in Experiment 3, and the obtained product was measured for weight, color, form, taste, and mouth feeling. Table 13 shows the results of the panels' evaluations.

TABLE 13

|  | Color | Form | Taste | Mouth feeling | Evaluation (sum) |
|---|---|---|---|---|---|
| Without contacting with α, α-trehalose (control) | 3.0 | 3.0 | 3.0 | 3.0 | 12.0 |
| α, α-Trehalose (solid) | 5.0 | 5.0 | 4.7 | 4.8 | 19.5 |
| α, α-Trehalose (liquid) | 4.7 | 4.5 | 4.6 | 4.3 | 18.1 |

The results of the panels' evaluations showed that the products, obtained by contacting with α,α-trehalose, kept the inherent properties of carrots such as color, taste, and satisfactory mouth feeling; they were remarkably superior as snack foods such as snack confectioneries, relishes, and refreshments, as well as portable foods and emergency foods which can be easily eaten without water. When the products of the present invention placed in a plastic container and allowed to stand in a thermostatic chamber without capping for two weeks at 40° C., the products kept their form and taste just after preparation and had a superior stability.

EXAMPLE 2

Commercialized pumpkins were cut off the vine, washed, cut lengthways, and removed inside seeds. They were cut into pieces of about three centimeters (cm) in width, sliced to about two millimeters in thickness by using "V-slicer MV-50", a business manual slicer commercialized by Shinkousha Co., Ltd., Saitama, Japan, to obtain sliced pumpkins in oblong card forms. They were divided into five equal groups and subjected to the following treatments. To contact with a saccharide in a solid form, the sliced pumpkins were pushed to adhere powders of α,α-trehalose or α-CD in a stainless tray on their both sides as uniformly as possible, and after two minutes, excessive amounts of powders were removed by vibrating. To contact with a saccharide in a liquid form, a 45% aqueous solution of α,α-trehalose or α-CD was prepared. One part by weight of the above sliced pumpkins was soaked in five parts by weight of each of the solutions at 35° C. for 10 minutes under mildly stirring conditions to penetrate α,α-trehalose. The sliced pumpkins were transferred into a stainless steel wire netting to drain off. They were placed into a stainless steel wire netting without being layered and steamed in a prewarmed steamer for 10 minutes while sending steam under a normal pressure. As a control, sliced pumpkins were treated similarly as the above treatment except for contacting with a saccharide. All steamed samples were dried into products, and they were measured for their color, form, taste, and mouth feeling. Table 14 shows the results of the panels' evaluations.

TABLE 14

|  | Color | Form | Taste | Mouth feeling | Evaluation (sum) |
|---|---|---|---|---|---|
| Without contacting with saccharide (control) | 3.0 | 3.0 | 3.0 | 3.0 | 12.0 |

TABLE 14-continued

|  | Color | Form | Taste | Mouth feeling | Evaluation (sum) |
|---|---|---|---|---|---|
| α, α-Trehalose (solid) | 5.0 | 5.0 | 4.7 | 4.8 | 19.5 |
| α, α-Trehalose (liquid) | 4.7 | 4.6 | 4.3 | 4.6 | 18.2 |
| α-CD (solid) | 4.7 | 4.6 | 4.3 | 4.4 | 18.0 |
| α-CD (liquid) | 4.1 | 4.1 | 3.7 | 3.9 | 15.8 |

The results of the panels' evaluations showed that the products, contacted with α,α-trehalose, kept the inherent properties of pumpkins such as color, taste, and satisfactory mouth feeling; they were remarkably superior as snack foods such as snack confectioneries, relishes, and refreshments, as well as portable foods and emergency foods which can be easily eaten without water.

The products, contacted with α-CD in a solid form, were superior to all evaluation items. They were remarkably superior as snack foods such as snack confectioneries, relishes, and refreshments. When the products of the present invention placed in a plastic container and allowed to stand in a thermostatic chamber without capping for two weeks at 40° C. under, the products kept their form and taste of just after preparation and had a superior stability.

EXAMPLE 3

After commercialized sweet potatoes were washed and peeled, they were sliced pieces with about three millimeters in thickness. The sliced sweet potatoes were divided into three equal groups and subjected to the following treatments. To contact with α, α-trehalose in a solid form, the sliced carrots were placed on a stainless steel wire netting and fixed by covering the sweet potatoes with another stainless steel wire netting. Powders of α, α-trehalose were sprayed all over the potatoes as uniformly as possible, and after two minutes, excessive amounts of powders were removed by vibrating. To contact with α,α-trehalose in a liquid form, an α,α-trehalose aqueous solution with the concentration of 15% was prepared. One part by weight of the above sliced sweet potatoes was soaked in five parts by weight of this solution at 30° C. for 10 minutes under mildly stirring conditions to penetrate α, α-trehalose. They were transferred on a stainless steel wire netting to drain off. They were placed on a stainless steel wire netting without being layered and steamed in a prewarmed steamer for eight minutes while sending steam under a normal pressure. As a control, sliced sweet potatoes were treated similarly as the above treatment except for contacting with α,α-trehalose. All steamed sweet potatoes were dried into products, and they were measured for their color, form, taste, and mouth feeling. Table 15 shows the results of the panels' evaluations.

TABLE 15

|  | Color | Form | Taste | Mouth feeling | Evaluation (sum) |
|---|---|---|---|---|---|
| Without contacting with saccharide (control) | 3.0 | 3.0 | 3.0 | 3.0 | 12.0 |
| α, α-Trehalose (solid) | 5.0 | 5.0 | 4.8 | 4.8 | 19.6 |

TABLE 15-continued

|  | Color | Form | Taste | Mouth feeling | Evaluation (sum) |
|---|---|---|---|---|---|
| α, α-Trehalose (liquid) | 4.5 | 4.5 | 5.0 | 4.6 | 18.6 |

The results of the panels' evaluations showed that all products, contacted with α,α-trehalose in solid and liquid forms, were accreted and/or penetrated α,α-trehalose; and they had satisfactory color, taste, mouth feeling, and nearly intact form. In all products, taste was reinforced because they were accreted and/or penetrated α,α-trehalose, and they were preferable as snack foods such as snack confectioneries, relishes, and refreshments, as well as portable foods and emergency foods which can be easily eaten without water.

When the products of the present invention placed in a plastic container and allowed to stand in a thermostatic chamber without capping for two weeks at 40° C., the products kept their form and taste just after preparation and had a superior stability.

EXAMPLE 4

Commercialized potatoes were washed and pilled by using a piller. They were sliced in round forms with about two millimeters in thickness by using "V-slicer MV-50", a business manual slicer commercialized by Shinkousha Co., Ltd., Saitama, Japan. They were divided into three equal groups and subjected to the following treatments. To contact a saccharide in a solid form, the sliced potatoes were removed the harshness by soaking in a cool water for 20 minutes, placed on a stainless steel wire netting and fixed by covering the potatoes with another stainless steel wire netting. Mixed powders of α,α-trehalose and sugar at the ratio of 4:1 were sprayed all over the potatoes as uniformly as possible, and after 30 seconds, excessive amounts of powders were removed by vibrating. To contact with a saccharide in a liquid form, α,α-trehalose and sugar were dissolved in water at the ratio of 4:1 to prepare a saccharide aqueous solution with a saccharide concentration of 40%. The sliced potatoes, which were removed the harshness, were placed on a stainless steel wire netting and sprayed the aqueous solution at 30° C. for five minutes to penetrate saccharides. They were placed on a stainless steel wire netting without being layered and steamed in a prewarmed steamer for 10 minutes while sending steam under a normal pressure. As a control, sliced potatoes were treated similarly as the above treatment except for contacting with saccharides. The steamed potatoes were dried into products, and the products were measured for their color, form, taste, and mouth feeling. Table 16 shows the results of the panels' evaluations.

TABLE 16

|  | Color | Form | Taste | Mouth feeling | Evaluation (sum) |
|---|---|---|---|---|---|
| Without contacting with saccharide (control) | 3.0 | 3.0 | 3.0 | 3.0 | 12.0 |
| α, α-Trehalose (solid) | 5.0 | 5.0 | 5.0 | 4.7 | 19.7 |
| α, α-Trehalose (liquid) | 5.0 | 4.6 | 4.7 | 4.6 | 18.9 |

The results of the panels' evaluations showed that the product, contacted with α,α-trehalose in a solid form, had reinforced taste because α,α-trehalose adhered on it. The product kept the inherent properties of potatoes such as color, taste, satisfactory mouth feeling; and they were remarkably superior as snack foods such as snack confectioneries, relishes, and refreshments, as well as portable foods and emergency foods which can be easily eaten without water. The products, contacted with α,α-trehalose in a liquid form, were also kept the inherent properties of potatoes such as color and taste, and had relatively-low sweetness; and they were superior as materials for side dish, retort pouches, and instant foods. When the products of the present invention placed in a plastic container and allowed to stand in a thermostatic chamber without capping for two weeks at 40° C., the products kept the form and taste just after preparation and had a superior stability.

EXAMPLE 5

Commercialized leeks were washed and sliced in round forms with about three millimeters in length. The sliced leeks were divided into five equal groups and subjected to the following treatments. To contact with a saccharide in a solid form, they were transferred on a stainless steel tray and dusted with powders of α,α-trehalose or maltitol as uniformly as possible under slowly shaking for five minutes. The sliced leeks were transferred on a stainless steel basket, and excessive amounts of powders were removed. To contact with a saccharide in a liquid form, an α,α-trehalose or maltitol aqueous solution with each saccharide concentration of 40% was prepared. One part by weight of the above sliced leeks was soaked in five parts by weight of each of the solutions at 30° C. for 20 minutes under mildly stirring conditions to penitrate each saccharide. They were transferred on a stainless steel wire netting to drain off. They were uniformly placed on a stainless steel wire netting and steamed in a prewarmed steamer for two minutes while sending steam under a normal pressure. As a control, sliced leeks were treated similarly as the above treatment except for contacting with a saccharide. The steamed leeks were quickly cooled at five ° C. in a cooled room, and then they were frozen and preserved at −40° C. in a freezer, "MDF-190" commercialized by SANYO Electric Co., Ltd., Osaka, Japan. The products were measured for their color, form, taste, and mouth feeling. Table 17 shows the results of the panels' evaluations.

TABLE 17

|  | Color | Form | Taste | Mouth feeling | Evaluation (sum) |
| --- | --- | --- | --- | --- | --- |
| Without contacting with saccharid (control) | 3.0 | 3.0 | 3.0 | 3.0 | 12.0 |
| α, α-Trehalose (solid) | 5.0 | 4.8 | 4.8 | 4.8 | 19.3 |
| α, α-Trehalose (liquid) | 4.9 | 4.5 | 4.7 | 4.6 | 18.7 |
| Maltitol (solid) | 4.9 | 4.6 | 3.9 | 4.5 | 17.9 |
| Maltitol (liquid) | 4.6 | 4.5 | 4.2 | 4.4 | 17.7 |

The results of the panels' evaluations showed that all products, contacted with saccharides, had much alike color and form, their mouth feeling was relatively-soft and better; and they were superior as materials for retort pouches, instant foods and second processed foods such as confectioneries and breads.

EXAMPLE 6

Commercialized peppers were washed, hollowed the vines out to remove the insides, and cut in oblong card forms with about two centimeters in length. The cut peppers were divided into five equal groups and subjected to the following treatments. To contact with a saccharide in a solid form, the cut peppers were transferred to a stainless steel tray and dusted with powders of α,α-trehalose as uniformly as possible under slowly shaking for five minutes. The treated peppers were transferred to a stainless steel basket, and excessive amounts of powders were removed. To contact with a saccharide in a liquid form, an α,α-trehalose aqueous solution with a trehalose concentration of 45% was prepared. One part by weight of the above peppers was soaked in five parts by weight of this solution at 35° C. for 15 minutes under mildly stirring conditions to penetrate α,α-trehalose. They were transferred to a stainless steel wire netting to drain off. They were placed onto a stainless steel wire netting without being layered and steamed in a prewarmed steamer for three minutes while sending steam under a normal pressure. As a control, cut peppers were treated similarly as the above treatment except for contacting with a saccharide. The steamed peppers were dried into products, and the products were measured for their color, form, taste, and mouth feeling. Table 18 shows the results of the panels' evaluations.

TABLE 18

|  | Color | Form | Taste | Mouth feeling | Evaluation (sum) |
| --- | --- | --- | --- | --- | --- |
| Without contacting with saccharide (control) | 3.0 | 3.0 | 3.0 | 3.0 | 12.0 |
| α, α-Trehalose (solid) | 5.0 | 4.6 | 5.0 | 4.8 | 19.4 |
| α, α-Trehalose (liquid) | 5.0 | 4.5 | 4.1 | 4.2 | 17.8 |

The results of the panels' evaluations showed that the product, contacted with α,α-trehalose in a solid form, had clear color and better taste having appropriate sweetness, though it transformed a little; and they were superior as snack foods such as snack confectioneries, relishes, and refreshments, as well as portable foods and emergency foods which can be easily eaten without water, materials for side dish, retort pouches, instant foods, and second processed foods such as confectioneries and breads. When the products of the present invention placed in a plastic container and allowed to stand in a thermostatic chamber without capping for two weeks at 40° C., the products kept their form and taste just after preparation and had a superior stability.

Commercialized apples were hollowed to remove the core, peeled, and sliced into pieces with about five millimeters in thickness. After the sliced apples were soaked in a saline solution of one % for 30 seconds, they were divided into five equal groups and subjected to the following treatments. To contact with a saccharide in a solid form, the sliced apples were placed onto a stainless steel wire netting and fixed by covering the apples with another stainless steel wire netting. They were dusted with powders of α,α-trehalose and maltitol as uniformly as possible, and after two minutes, excessive amounts of powders were removed by vibrating. To contact with a saccharide in a liquid form, an α,α-trehalose or maltitol aqueous solution with each saccharide concentration of 35% was prepared. One part by weight of the above sliced apples was soaked in five parts by weight of each of the solutions at 30° C. for five minutes under mildly stirring conditions to penetrate each saccharides. They were transferred on a stainless steel wire netting to drain off. They were uniformly placed on a stainless steel wire netting without being layered and steamed in a prewarmed steamer for five minutes while sending steam under a normal pressure. As a control, sliced apples were treated similarly as the above treatment except for contacting with a saccharide. The steamed apples were dried into products, and the products were measured for their color, form, taste, and mouth feeling. Table 19 shows the results of the panels' evaluations.

TABLE 19

|  | Color | Form | Taste | Mouth feeling | Evaluation (sum) |
|---|---|---|---|---|---|
| Without contacting with saccharid (control) | 3.0 | 3.0 | 3.0 | 3.0 | 12.0 |
| α, α-Trehalose (solid) | 5.0 | 5.0 | 5.0 | 4.6 | 19.6 |
| α, α-Trehalose (liquid) | 4.4 | 4.6 | 4.8 | 4.5 | 18.3 |
| Maltitol (solid) | 4.7 | 4.6 | 4.3 | 4.5 | 18.1 |
| Maltitol (liquid) | 4.6 | 4.5 | 4.1 | 4.3 | 17.5 |

The results of evaluations showed that all products obtained by contacting α,α-trehalose had better color, form, taste, and mouth feelings. A product obtained by contacting maltitol in a solid form had the inherent taste of apples and better mouth feeling. They were remarkably superior as materials for side dish and snack foods such as snack confectioneries, relishes, and refreshments. Products used α,α-trehalose were superior as portable foods and emergency foods which can be easily eaten without water. When the products of the present invention are placed in a plastic container and allowed to stand in a thermostatic chamber without capping for two weeks at 40° C., the products kept their form and taste just after preparation and had a superior stability.

EXAMPLE 8

Commercialized bananas with a relatively-low ripened degree were peeled and sliced into pieces of about three millimeters in thickness. The sliced bananas were divided into five equal groups and subjected to the following treatments. To contact with a saccharide in a solid form, the sliced bananas were placed onto a stainless steal wire netting and fixed by covering the bananas with another stainless wire netting. Powders of α,α-trehalose or α-CD were sprayed all over the bananas as uniformly as possible, and after two minutes, excessive amounts of powders were removed by vibrating. To contact with a saccharide in a liquid form, an α,α-trehalose or α-CD aqueous solution with each saccharide concentration of 25% was prepared. The sliced bananas were placed onto a stainless wire netting and sprayed each aqueous solutions at 20° C. for five minutes to penetrate saccharides. The sliced bananas were placed on a stainless steel wire netting without being layered and steamed in a prewarmed steamer for five minutes while sending steam under a normal pressure. As a control, sliced bananas were treated similarly as the above treatment except for contacting with a saccharide. The steamed bananas were dried into products, and the products were measured for their color, form, taste, and mouth feeling. Table 20 shows the results of the panels' evaluations.

TABLE 20

|  | Color | Form | Taste | Mouth feeling | Evaluation (sum) |
|---|---|---|---|---|---|
| Without contacting with saccharide (control) | 3.0 | 3.0 | 3.0 | 3.0 | 12.0 |
| α, α-Trehalose (solid) | 5.0 | 5.0 | 5.0 | 5.0 | 20.0 |
| α, α-Trehalose (liquid) | 5.0 | 5.0 | 4.7 | 4.3 | 19.0 |
| α-CD (solid) | 4.8 | 4.5 | 4.4 | 4.5 | 18.2 |
| α-CD (liquid) | 4.3 | 4.3 | 4.2 | 3.9 | 16.7 |

The results of the panels' evaluations showed that all products, contacted with α,α-trehalose, had superior color, form, taste, and mouth feeling. Products, contacted with α-CD in a solid form, kept the inherent properties of banana such as color, taste, satisfactory mouth feeling. These products were remarkably superior as snack foods such as snack confectioneries, relishes, and refreshments. The products, used α,α-trehalose, were superior as portable foods and emergency foods which can be easily eaten without water. When the products of the present invention placed in a plastic container and allowed to stand in a thermostatic chamber without capping for two weeks at 40° C., the products kept their form and taste just after preparation and had a superior stability.

EXAMPLE 9

The inner films were removed from commercialized chestnuts and cut into round forms with about three millimeters in thickness. The cut chestnuts were divided into three equal groups of the same size and subjected to the following treatments.

To contact with a saccharide in a solid form, the chestnuts were soaked in a pullulan aqueous solution with a pullulan concentration of two percents, transferred onto a stainless steal tray, and dusted with α,α-trehalose as uniformly as possible under slowly mixing for five minutes. They were transferred on a stainless steel basket, and excessive amounts of powders were removed. To contact with a saccharide in a liquid form, an α,α-trehalose aqueous solution with an α,α-trehalose concentration of 50% including pullulan of 2% was prepared. One part by weight of the above chestnuts was soaked in five parts by weight of the solution at 40° C. for 20 minutes under mildly stirring conditions to penetrate saccharides. They were transferred to a stainless steel wire basket to drain off. They were placed onto a stainless steel wire netting without being layered and steamed in a prewarmed steamer for five minutes while sending steam under a relatively-high pressure of one kg/cm As a control, cut chestnuts treated similarly as the above treatment except for contacting with a saccharide. The steamed chestnuts were dried into products, and they were measured for their color, form, taste, and mouth feeling. Table 21 shows the results of the panels' evaluations.

TABLE 21

|  | Color | Form | Taste | Mouth feeling | Evaluation (sum) |
|---|---|---|---|---|---|
| Without contacting with saccharide (control) | 3.0 | 3.0 | 3.0 | 3.0 | 12.0 |

TABLE 21-continued

|  | Color | Form | Taste | Mouth feeling | Evaluation (sum) |
|---|---|---|---|---|---|
| α, α-Trehalose (solid) | 5.0 | 4.6 | 4.7 | 4.3 | 18.6 |
| α, α-Trehalose (liquid) | 5.0 | 4.5 | 4.5 | 4.1 | 18.1 |

The adhering amount of α,α-trehalose increased by using pullulan, and satisfactory products were obtained. The results of the panels' evaluations showed that the products, contacted with α,α-trehalose, had satisfactory color, mouth feeling, and form, though taste was different depending on the adhering amount of α,α-trehalose. They were superior as snack foods such as snack confectioneries, relishes, and refreshments, as well as portable foods and emergency foods which can be easily eaten without water. When the products of the present invention were placed in a plastic container and allowed to stand in a thermostatic chamber without capping for two weeks at 40° C., the products kept their form and taste just after preparation and had a superior stability.

EXAMPLE 10

Commercialized shrimps were shelled and cut in round forms with about 10 mm in thickness. The cut shrimps were divided into three equal groups and subjected to the following treatments. To contact with a saccharide in a solid form, the cut shrimps were transferred on a stainless steel tray and dusted with powders of α,α-trehalose as uniformly as possible under slowly shaking for five minutes. The shrimps were transferred on a stainless steel basket, and excessive amounts of powders were removed. To contact with a saccharide in a liquid form, an α,α-trehalose aqueous solution with an α,α-trehalose concentration of 35% was prepared. One part by weight of the above cut shrimps was soaked in five parts by weight of the solution at 40° C. for five minutes under mildly stirring conditions to penetrate α,α-trehalose. The cut shrimps were transferred on a stainless steel wire netting to drain off. They were placed on a heat-resistant glass tray, covered with a plastic wrap, and heated for five minutes by a microwave oven for a family use. As a control, cut shrimps were treated similarly as the above treatment except for contacting with a saccharide. The obtained products were measured for their color, form, taste, and mouth feeling. Table 22 shows the results of the panels' evaluations.

TABLE 22

|  | Color | Form | Taste | Mouth feeling | Evaluation (sum) |
|---|---|---|---|---|---|
| Without contacting with saccharide (control) | 3.0 | 3.0 | 3.0 | 3.0 | 12.0 |
| α, α-Trehalose (solid) | 5.0 | 4.6 | 5.0 | 4.7 | 19.3 |
| α, α-Trehalose (liquid) | 4.9 | 4.6 | 4.3 | 4.3 | 18.2 |

The results of the panels' evaluations showed that all products, contacted with α,α-trehalose, had improved taste and kept the inherent color of shrimps; the product, contacted with α, α-trehalose in a solid form, had satisfactory mouth feeling; and it was remarkably superior to snack foods such as snack confectioneries, relishes, and refreshments, as well as materials for side dish, retort pouches, and instant foods. When the products of the present invention were placed in a plastic container and allowed to stand in a thermostatic chamber without capping for two weeks at 40° C., the products kept their form and taste just after preparation and had a superior stability.

EXAMPLE 11

Commercialized raw and small launces were washed in a saline solution of three percents, divided into three equal groups and subjected to the following treatments. To contact with a saccharide in a solid form, the launces were transferred on a stainless steel tray and dusted with powders of α,α-trehalose as uniformly as possible under slowly shaking for five minutes. They were transformed on a stainless steel basket, and excessive amounts of powders were removed. To contact with a saccharide in a liquid form, an α,α-trehalose aqueous solution with an α,α-trehalose concentration of 35% was prepared. One part by weight of the above launces was soaked in five parts by weight of this solution at 25° C. for 15 minutes under mildly stirring conditions to penetrate α,α-trehalose. The launces were transferred on a stainless steel basket to drain off. They were steamed in a steamer for a family use for 15 minutes. As a control, launces were treated similarly as the above treatment except for contacting with a saccharide. The steamed launces were dried into products, and the products were measured for their color, form, taste, and mouth feeling. Table 23 shows the results of the panels' evaluations.

TABLE 23

|  | Color | Form | Taste | Mouth feeling | Evaluation (sum) |
|---|---|---|---|---|---|
| Without contacting with saccharide (control) | 3.0 | 3.0 | 3.0 | 3.0 | 12.0 |
| α, α-Trehalose (solid) | 5.0 | 5.0 | 4.8 | 4.7 | 19.5 |
| α, α-Trehalose (liquid) | 4.4 | 3.9 | 4.1 | 4.6 | 17.0 |

The results of the panels' evaluations showed that the product, contacted with α,α-trehalose in a solid form, had improved taste, kept the inherent flavor of launces, and had satisfactory mouth feeling; and it was remarkably superior to snack foods such as snack confectioneries, relishes, and refreshments, as well as materials for side dish. When the products of the present invention were placed in a plastic container and allowed to stand in a thermostatic chamber without capping for two weeks at 40° C., the products kept their form and taste, and had a superior stability.

EXAMPLE 12

Commercialized kelps were quickly washed, drained off, and cut in pieces with about two centimeters in length and width. The cut kelps were divided into five equal groups and subjected to the following treatments. To contact with a saccharide in a solid form, the cut kelps were soaked in water for 10 minutes, placed on a stainless steel wire netting, and fixed by covering the kelps with another stainless steel wire netting. Powders of α,α-trehalose or maltitol were sprayed all over the kelps as uniformly as possible, and after five minutes, excessive amounts of powders were removed by vibrating. To contact with a saccharide in a liquid form, an α,α-trehalose or maltitol aqueous solution with each saccharide concentration of 35% was prepared. One part by weight of the above kelps was soaked in five parts by weight of each of the solutions at 40° C. for 20 minutes under mildly stirring conditions to penetrate each saccharide. The kelps were transferred on a stainless steel wire netting to drain off. They were soaked in colza oil heated at 175° C. for 10 seconds to fry. As a control, cut kelps were treated similarly as the above treatments except for contacting with a saccharide. The fried kelps were measured for their color, form, taste, and mouth feeling. Table 24 shows the results of the panels' evaluations.

TABLE 24

|  | Color | Form | Taste | Mouth feeling | Evaluation (sum) |
| --- | --- | --- | --- | --- | --- |
| Without contacting with saccharide (control) | 3.0 | 3.0 | 3.0 | 3.0 | 12.0 |
| α, α-Trehalose (solid) | 4.7 | 5.0 | 4.8 | 4.7 | 19.2 |
| α, α-Trehalose (liquid) | 3.9 | 4.6 | 4.8 | 4.2 | 17.5 |
| Maltitol (solid) | 4.4 | 5.0 | 4.7 | 4.8 | 18.9 |
| Maltitol (liquid) | 4.1 | 4.5 | 4.6 | 3.8 | 17.0 |

The results of the panels' evaluations showed that all products, contacted with α,α-trehalose or maltitol in solid forms, had satisfactory color, taste, and mouth feeling. The products were superior to snack foods such as snack confectioneries, relishes, and refreshments, as well as materials for side dish, retort pouches, and instant foods. When the products of the present invention were placed in a plastic container and allowed to stand in a thermostatic chamber without capping for two weeks at 40° C., the products kept their form and taste just after preparation, and had a superior stability.

EXAMPLE 13

Commercialized raw shiitake mushrooms were sliced in pieces with about five millimeters in thickness. The sliced Shiitake mushrooms were divided into three equal groups and subjected to the following treatments. To contact with a saccharide in a solid form, the sliced shiitake mushrooms were soaked in a seasoning mixture with water:sake:soy sauce=2:2:1 for 10 minutes, transferred on a stainless steel tray, dusted with powders of α,α-trehalose as uniformly as possible under slowly shaking for five minutes. They were transferred on a stainless steel basket, and excessive amounts of powders were removed. To contact with a saccharide in a liquid form, an α,α-trehalose solution with an α,α-trehalose concentration of 50% by using the above seasoning mixture was prepared. One part by weight of the above sliced shiitake mushrooms was soaked in five parts by weight of the solution at 30° C. for 10 minutes under mildly stirring conditions to penetrate α, α-trehalose. They were transferred on a stainless steel basket to drain off. The treated mushrooms were seared in an oven for five minutes. As a control, sliced shiitake mushrooms were treated similarly as the above treatments except for contacting with a saccharide. The products were measured for their color, form, taste, and mouth feeling. Table 25 shows the results of the panels' evaluations.

TABLE 25

|  | Color | Form | Taste | Mouth feeling | Evaluation (sum) |
| --- | --- | --- | --- | --- | --- |
| Without contacting with saccharide (control) | 3.0 | 3.0 | 3.0 | 3.0 | 12.0 |
| α, α-Trehalose (solid) | 5.0 | 5.0 | 4.9 | 4.7 | 19.6 |
| α, α-Trehalose (liquid) | 4.4 | 4.6 | 4.3 | 4.6 | 17.9 |

The results of the panels' evaluations showed that all products had improved taste by adding the seasoning mixture and α,α-trehalose; they kept the inherent properties of shiitake mushrooms such as color and mouth feeling, satisfactory mouth feeling; and they were remarkably superior to snack foods such as snack confectioneries, relishes, and refreshments, as well as material for side dish, retort pouches, and instant foods.

When the products of the present invention were placed in a plastic container and allowed to stand in a thermostatic chamber without capping for two weeks at 40° C., the products kept their form and taste just after preparation and had a superior stability.

EXAMPLE 14

Commercialized carrots were sliced in pieces with about seven millimeters in thickness. The sliced carrots were placed on a stainless steel wire netting without being layered and fixed by covering the carrots with another stainless steel wire netting. The sliced carrots were wetted by spraying appropriate water on the surface and were dusted all round with powders of α,α-trehalose as uniformly as possible. The sliced carrots were transferred in a preheated steamer and steamed for 10 minutes while sending steam under a normal pressure. As a control, sliced carrots were treated similarly as the above treatments except for contacting with a saccharide. The steamed carrots were dried at 50° C. for one hour while ventilating and heated for two minutes by using a microwave oven for a family use. The heated samples were dried into products, and the products were measured for their color, form, taste, and mouth feeling. Table 26 shows the results of the panels' evaluations.

TABLE 26

|  | Color | Form | Taste | Mouth feeling | Evaluation (sum) |
| --- | --- | --- | --- | --- | --- |
| Without contacting with saccharide (control) | 3.0 | 3.0 | 3.0 | 3.0 | 12.0 |
| α, α-Trehalose (solid) | 4.9 | 4.7 | 5.0 | 5.0 | 19.6 |

The results of the panels' evaluations showed that the product, contacted with α,α-trehalose, kept the inherent properties of carrots such as color, taste, and satisfactory mouth feeling; and they were uniformly expanded by heating with a microwave, and had crispy and light mouth feeling. They were remarkably superior to snack foods such as snack confectioneries, relishes, and refreshments, as well as materials for side dish, retort pouches, and instant foods. When the products of the present invention were placed in a plastic container and allowed to stand in a thermostatic chamber without capping for two weeks at 40° C., the products kept their form and taste just after preparation and had a superior stability.

INDUSTRIAL APPLICABILITY

As described above, the present invention provides a relatively-easy and economical process for producing processed foods which effectively exert the inherent flavor and taste of food materials and have a superior stability. The process for producing processed foods is characterized in that it comprises the steps of contacting a food material with a saccharide(s) to accrete and/or penetrate the saccharide(s) to and/or into an intact food material without blanching, and then heating the resulting mixture by one or more heating methods selected from the group consisting of steaming, baking, frying, and microwaving; and the process was preferable as an industrial process. Moreover, processed foods with a superior preservative stability for a relatively-long period of time can be advantageously produced by drying and freezing the above processed foods. The establishment of the present invention provides a process for producing new processed foods, and the products produced by the process were easily utilized as snack foods such as snack confectioneries, relishes, and refreshments; materials for side dish; ingredients; and materials for second processed foods; as well as foods for maintenance and promotion of health, and foods for prevention and treatment of many diseases. Therefore, the present invention has remarkable-high industrial significance to many food arts.

The invention claimed is:

1. A process for producing saccharide coated foods, comprising the steps of:
   a. coating a raw food material with one or more saccharides in a solid form selected from the group consisting of $\alpha,\alpha$-trehalose, cyclic oligosaccharides and sugar alcohols in a sufficient amount to cover over the raw food material,
   b. heating the resulting product before the saccharide(s) is melted and is penetrated into the raw food material at a temperature of 100° C. or over for 2 to 15 minutes to melt the saccharide over the resulting product without any soaking step,
   c. drying or cooling the product to solidify the melted saccharide(s) over the product; whereby the inherent color, taste and shape of the raw food material are substantially retained, and,
   d. steps (a) to (c) are sequentially operated on a belt conveyer.

2. The process of claim 1, wherein said raw food material is in an intact form or is in the form of pieces, tissue, or intact organ.

3. The process of claim 1, wherein said saccharide is in a solid form of crystals, granular powder, or granules, and optimally in combination with one or more additives selected from the group consisting of adhesives and seasonings.

4. The process of claim 1, wherein the temperature in step (b) is from 120 to 150° C.

* * * * *